Dec. 24, 1935.   F. A. ADAMSKI   2,025,631
DRY CELL BATTERY
Original Filed May 2, 1927
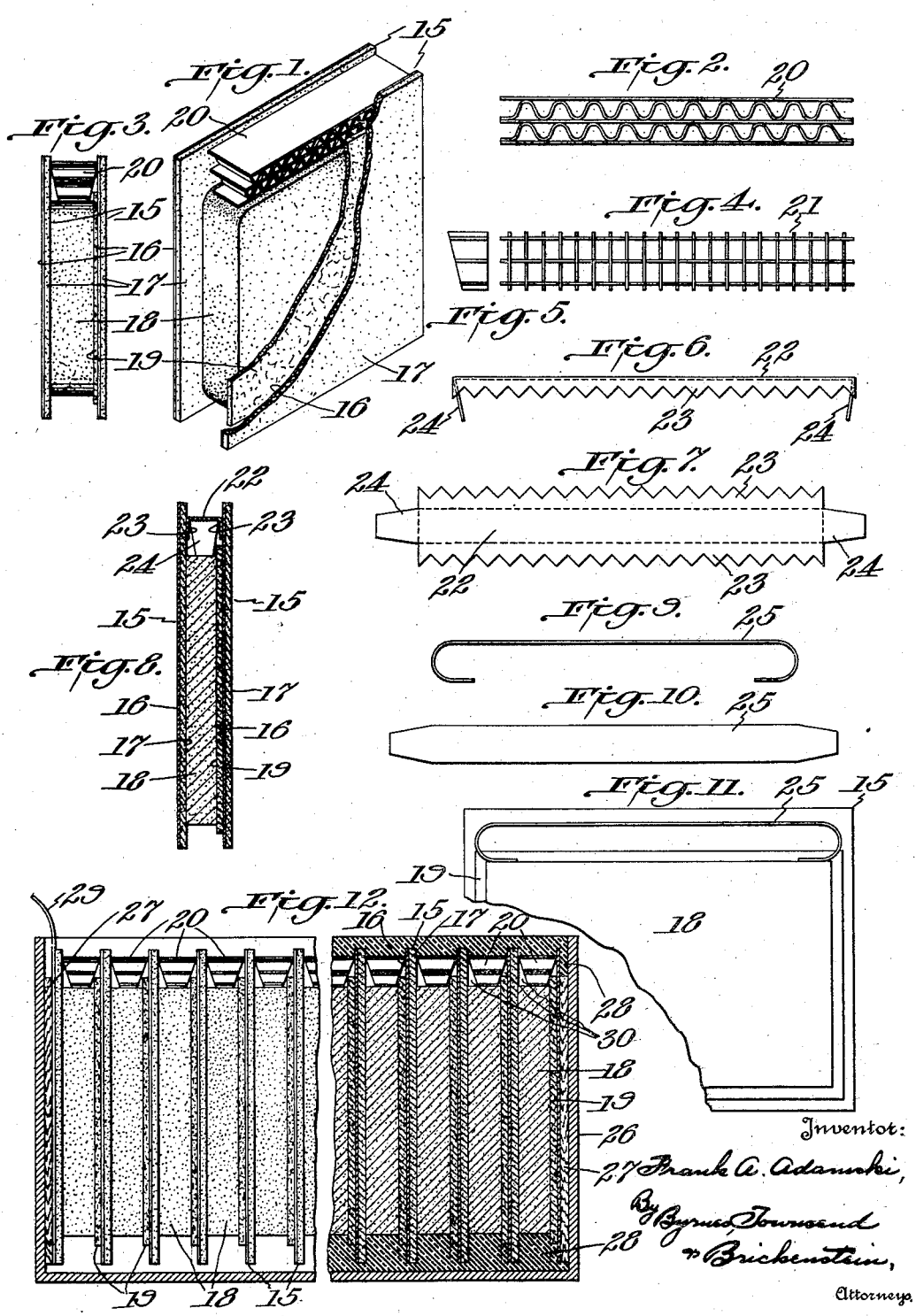
Inventor:
Frank A. Adamski,
By Byrnes, Townsend
& Brickenstein,
Attorneys Patented Dec. 24, 1935

2,025,631

UNITED STATES PATENT OFFICE 2,025,631

DRY CELL BATTERY

Frank A. Adamski, Lakewood, Ohio, assignor to National Carbon Company, Inc., a corporation of New York Application May 2, 1927, Serial No. 188,370
Renewed July 15, 1933

3 Claims. (Cl. 136—111)

This invention relates to dry cells of the flat type, and more particularly to batteries composed of such cells.

The chemical reactions which take place in a dry cell cause liberation of gas. The liberated gas tends to cause the paste electrolyte (rendered more fluid by hydrolysis) to be forced away from the vicinity of the anode into other parts of the cell. In batteries of the type disclosed in U. S. patent to Rider and Huntley, No. 1,508,987, which comprise a plurality of spaced "duplex" electrodes with depolarizer mix in the inter-electrode spaces, such paste is forced to the peripheral parts of the cells and tends to break down the insulating material and cause inter-cell communication and short-circuiting of the battery. By the term "duplex" electrode is meant an electrode comprising a plate or strip of zinc or other suitable metal coated on one side with a plastic electrolyte-resistant material possessing electrically conductive properties, and adapted when assembled with the other necessary dry cell elements in a multi-cell battery to act respectively as the negative electrode of one cell and the positive electrode of the next succeeding cell.

The present invention has for an object the provision of air spaces at convenient points adjacent the peripheral portions of the cells of the battery for reception of paste and moisture which may be forced away from the vicinity of the anode surfaces by the liberated gases, and the location of such air spaces in such proximity to the anodes of the respective cells that the paste and moisture may tend to flow back into position adjacent the anodes where the cell activating properties of such paste and moisture may be further utilized.

A further object of the invention is to provide means permitting of the sealing of the battery against inter-cell communication in a more positive manner than heretofore.

Other objects will appear as the description proceeds.

In the drawing Figure 1 is a perspective view, with portions broken away, of a cell unit including one form of means for providing the air space.

Figure 2 is a side elevation of the spacing means shown in Figure 1.

Figure 3 is an end elevation of a cell unit embodying spacing means like that shown in Figures 1 and 2.

Figure 4 is a side elevation of a modified form of the spacing means.

Figure 5 is an end elevation of the spacing means shown in Figure 4.

Figure 6 is a side elevation and Figure 7 is a plan view of another form of the spacing means.

Figure 8 is a vertical sectional view of a cell unit equipped with the spacing means shown in Figures 6 and 7.

Figures 9 and 10 are side elevation and plan views, respectively, of still another modification of the spacing means.

Figure 11 is a side elevation of a cell unit with one of the cooperating duplex electrodes removed.

Figure 12 is a part sectional and part elevational view of a battery of cells embodying the spacing means of the present invention.

In Figure 1 of the drawing, 15 represents duplex electrodes each comprising a zinc plate or strip 16 coated on one side with an electrolyte-resistant carbonaceous plastic 17. Disposed in contacting relation with the coated side of one of the electrodes is a depolarizing mix cake 18. A pulpboard spacer or separator 19 is placed in contact with the opposite side of the mix cake and separates the same from the zinc surface of the next succeeding duplex electrode 15. The spacer 19 is preferably pasted on the side adjacent the zinc electrode 16 in known manner. The duplex electrodes are preferably rectangular and somewhat wider, even at the narrower side than the mix cakes, so that when associated with mix cakes in a cell assembly the electrodes will project on each of three sides for a short distance beyond the peripheral edges of the intervening mix cakes and at the top they will project a sufficiently greater distance beyond the mix cakes to provide spaces within their upper marginal edges for air spaces. The air spaces are maintained by placing a seal-supporting structure, such as 20 on the upper edge of each of the mix cakes 18. The seal-supporting structure 20 presents in cross-section the general shape of a truncated pyramid and preferably is inserted, after the cell elements are completely assembled into a battery of the desired size, with the small side down and resting on the mix cake while the edges of the wider side are brought into close-fitting relation with the sides of the adjacent electrodes so as to prevent sealing plastic from entering from the top while at the same time providing unobstructed passages past the lower edges for the passage of paste exuded from the vicinity of the anode. The seal-supporting structure 20 is shown as consisting of two tiers of corrugated strawboard cemented together. It will be understood that the number of tiers may be varied depending upon the size of the space to be provided.

Other forms of spacing means may be used to accomplish the same purpose. For example, in Figures 4 and 5 is shown an alternative form of cellular structure 21 which is constructed in a manner analogous to the spacing members used in carriers and shipping containers for transporting eggs and similar articles. It is to be understood that the seal-supporting structure 21 is not limited to a construction which in cross-section assumes the shape indicated in Figure 5. It may assume the shape in cross-section of the structure 20 and vice versa.

In Figures 6, 7 and 8 is shown still another form of seal-supporting means 22 adapted to maintain the desired air space. This support is formed by cutting or stamping out a piece of sheet insulating material such as paraffined chipboard to the shape shown in Figure 7. The piece thus formed is scored along the broken lines shown in Figure 7 and then the serrated edges 23 and the projecting ends 24 are bent at right angles to the plane of the sheet to form a canopy-like structure as shown in Figure 6. The support 22 when formed into the shape above described is then inserted between the duplex electrodes with the end tabs 24 resting upon the intervening mix cake. The serrated side members 23 press against the sides of the adjacent electrodes and effectually seal the air space against access of sealing material and also serve to prevent the crushing of the support due to the weight of the seal poured thereon.

Figures 9 and 10 show still another modification of the seal-supporting means which is formed from an insulating sheet of pulpboard or other suitable fibrous material which may be bent and will hold its shape as thus bent. In Figure 10 is shown a strip of such material 25 stamped to the shape desired and Figure 9 is a side elevation of such strip showing the shape it assumes when the ends are bent into the position which is assumed when the strip is placed in the cell assembly. In Figure 11 is shown a strip 25 placed in position on the mix cake of a cell unit and having an edge of its upper plane surface resting against the zinc side of a duplex electrode. The cooperating duplex electrode, the carbonaceous-coating side of which rests against the opposite edge of the strip 25 is not shown.

Figure 12 shows a battery assembly with the seal-supporting means 20 in position between the electrodes to maintain the desired air spaces for the respective cell units. In addition to the elements previously described, 26 is a box of paperboard, cardboard or other suitable material for holding the assembly, 27 are the usual end boards of wood or the like, and 28 is a suitable insulating plastic which is poured about the assembly after it is inserted in the box 26. One of the battery terminals is indicated at 29.

As shown in Figure 12 the duplex electrodes 15 preferably project a short distance above the upper plane surface of the seal-supporting member 20, thereby insuring that the upper edge portions of the electrodes are embedded in the sealing plastic. In this way the tendency of the electrolyte and moisture, under the internal pressures created, to penetrate along the line of contact between the sealing material and the ends of the duplex electrodes and cause short-circuiting is substantially restricted. It is also to be noted that the bibulous spacer 19 projects into the air space 30. By thus affording a readily accessible passage for the return of the exuded electrolyte to the vicinity of the anode, the efficiency of the battery is promoted.

Minor changes in the details of the construction shown may be made without departing from the scope of the invention as set forth in the appended claims.

I claim:

1. A battery assembly comprising a plurality of flat electrode elements arranged in spaced relation, depolarizer mix in the inter-electrode spaces and spaced from the peripheral edges of said electrodes, seal-supporting means resting on the mix and defining air spaces, said seal-supporting means being in close-fitting relation with the electrode elements on the seal-supporting side and spaced from such elements on the side in contact with the mix, and a plastic seal resting upon the said seal-supporting means and surrounding said battery assembly.

2. A seal-supporting unit for use in batteries of flat dry cells, comprising an elongated cellular structure wedge-shaped in cross-section and having an upper plane surface impervious to sealing material.

3. A dry battery comprising flat elements in parallel spaced relation, each cell comprising a pair of electrodes, a flat depolarizing mix cake between the electrodes and an element extending between the electrodes and spaced from the depolarizing mix, said element having its edges bent at substantially right angles for contacting with the electrodes to maintain the element in position.

FRANK A. ADAMSKI.